US012236906B2

(12) United States Patent
Kim et al.

(10) Patent No.: US 12,236,906 B2
(45) Date of Patent: Feb. 25, 2025

(54) DISPLAY APPARATUS AND DRIVING METHOD THEREOF

(71) Applicant: SAMSUNG ELECTRONICS CO., LTD., Suwon-si (KR)

(72) Inventors: Doyoung Kim, Suwon-si (KR); Junghyuk Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/382,286

(22) Filed: Oct. 20, 2023

(65) Prior Publication Data

US 2024/0054965 A1 Feb. 15, 2024

Related U.S. Application Data

(63) Continuation of application No. PCT/KR2023/012493, filed on Aug. 23, 2023.

(30) Foreign Application Priority Data

Dec. 2, 2022 (KR) ........................ 10-2022-0166840

(51) Int. Cl.
*G09G 3/34* (2006.01)

(52) U.S. Cl.
CPC ..... *G09G 3/342* (2013.01); *G09G 2320/0233* (2013.01); *G09G 2320/0257* (2013.01); *G09G 2340/0435* (2013.01)

(58) Field of Classification Search
CPC ... G09G 3/34–3426; G09G 2320/0233; G09G 2320/0242; G09G 2320/0247;
(Continued)

(56) References Cited

U.S. PATENT DOCUMENTS 10,262,621 B2 4/2019 Jung
10,621,934 B2 4/2020 Takahashi et al.
(Continued)

FOREIGN PATENT DOCUMENTS

KR 10-2007-0036066 A 4/2007
KR 10-0956567 B1 5/2010
(Continued)

OTHER PUBLICATIONS

English translation of TW-1740440-B (Year: 2021).*
(Continued)

*Primary Examiner* — Nathan Danielsen
(74) *Attorney, Agent, or Firm* — Sughrue Mion, PLLC

(57) ABSTRACT

Provided is a display apparatus including: a display panel, a backlight unit configured to output light, a backlight driver configured to drive the backlight unit by identifying a dimming section of the backlight unit corresponding to a variable refresh rate of an image, based on reception of a sync signal, a memory storing at least one instruction, and at least one processor configured to execute the at least one instruction. The display apparatus is configured to identify a first output frequency of a sync signal that varies based on the variable refresh rate of the image, output the sync signal to the backlight driver in a second output frequency that is a higher frequency than the first output frequency, based on predetermined information, and drive the backlight unit corresponding to the variable refresh rate of the image, based on receiving the sync signal in the second output frequency.

20 Claims, 16 Drawing Sheets

(58) Field of Classification Search
CPC ....... G09G 2320/0257; G09G 2320/06; G09G 2320/0613; G09G 2320/062; G09G 2320/0626; G09G 2320/064; G09G 2320/0686; G09G 2340/0435
See application file for complete search history.

(56) References Cited

U.S. PATENT DOCUMENTS

| | | | | |
|---|---|---|---|---|
| 10,991,321 | B1 | 4/2021 | Chen et al. | |
| 11,336,879 | B2 | 5/2022 | Kwon | |
| 11,341,934 | B2 | 5/2022 | Lee et al. | |
| 11,501,723 | B2 | 11/2022 | Chen et al. | |
| 11,580,937 | B2 | 2/2023 | Lee et al. | |
| 11,798,508 | B2 | 10/2023 | Jeong | |
| 2016/0358561 | A1* | 12/2016 | Chen | G09G 3/3406 |
| 2018/0061358 | A1 | 3/2018 | Jung | |
| 2018/0166033 | A1 | 6/2018 | Takahashi et al. | |
| 2020/0280657 | A1* | 9/2020 | Liao | G09G 3/3413 |
| 2020/0302893 | A1* | 9/2020 | Lin | G09G 3/34 |
| 2020/0394971 | A1* | 12/2020 | Kim | G09G 3/3406 |
| 2021/0312876 | A1 | 10/2021 | Chen et al. | |
| 2021/0398508 | A1 | 12/2021 | Lee et al. | |
| 2022/0277709 | A1 | 9/2022 | Lee et al. | |
| 2022/0319458 | A1 | 10/2022 | Jeong | |

FOREIGN PATENT DOCUMENTS

| | | | | | |
|---|---|---|---|---|---|
| KR | 10-2018-0024425 | A | | 3/2018 | |
| KR | 10-2118079 | B1 | | 6/2020 | |
| KR | 10-2021-0142761 | A | | 11/2021 | |
| KR | 10-2021-0158458 | A | | 12/2021 | |
| KR | 10-2022-0082663 | A | | 6/2022 | |
| TW | 1740440 | B | * | 9/2021 | |
| WO | 03/100724 | A2 | | 12/2003 | |
| WO | 2006/000938 | A1 | | 1/2006 | |
| WO | WO-2010089682 | A1 | * | 8/2010 | G09G 3/2096 |

OTHER PUBLICATIONS

International Search Report (PCT/ISA/210) issued by the International Searching Authority on Dec. 7, 2023 in International Application No. PCT/KR2023/012493.
Written Opinion (PCT/ISA/237) issued by the International Searching Authority on Dec. 7, 2023 in International Application No. PCT/KR2023/012493.

* cited by examiner

DISPLAY APPARATUS AND DRIVING METHOD THEREOF

CROSS-REFERENCE TO RELATED APPLICATION(S)

This application is a bypass continuation of International Application No. PCT/KR2023/012493, filed on Aug. 23, 2023, which is based on and claims priority to Korean Patent Application No. 10-2022-0166840, filed on Dec. 2, 2022, in the Korean Intellectual Property Office, the disclosures of which are incorporated by reference herein in their entireties.

BACKGROUND

1. Field

The disclosure relates to a display apparatus and a driving method thereof, and more particularly, to a display apparatus including a backlight and a driving method thereof.

2. Description of the Related Art

In a display, an "afterimage" refers to generation of distortion in an image that is displayed. An afterimage may be generated due to optical illusion by a human eye, and it can be found in an image or in a display. Motion blur is an afterimage where distortion is generated in an image in which the boundary of an object moving in a moving image is blurred, and a method for resolving motion blur is motion blur reduction.

Motion blur reduction is a method of reducing generation of optical illusion by arranging black screens in several places according to a reproduction frequency (a scanning rate) of a display. For example, a black image is provided by turning off a backlight for a short while during a time period of displaying a first frame, and when a human eye that remembers the image right before sees the next screen, the previously remembered image is a black image, and accordingly, the first frame may not appear as an afterimage in a second frame displayed after the black image.

SUMMARY

Provided are a display apparatus including a backlight, and a method of driving the display apparatus, wherein the display apparatus and method may implement a motion blur reduction function of minimizing a change of a luminance of the display apparatus while varying a refresh rate.

According to an aspect of the disclosure, a display apparatus includes: a display panel; a backlight unit configured to output light; a backlight driver configured to drive the backlight unit by identifying a dimming section of the backlight unit corresponding to a variable refresh rate of an image, based on reception of a sync signal; a memory storing at least one instruction; and at least one processor operatively connected with the display panel, the backlight unit, the backlight driver, and the memory. The at least one processor is configured to execute the at least one instruction to: identify a first output frequency of a sync signal that varies based on the variable refresh rate of the image, output the sync signal to the backlight driver in a second output frequency that is a higher frequency than the first output frequency, based on predetermined information, wherein the backlight driver is configured to drive the backlight unit corresponding to the variable refresh rate of the image, based on receiving the sync signal in the second output frequency.

The predetermined information may include information for identifying a sync signal and a variable frequency of the image, based on a variable frequency among a plurality of sync signals received at the backlight driver.

The at least one processor may be further configured to execute the at least one instruction to: output the sync signal to the backlight driver in a frequency corresponding to a n-multiple of the first output frequency, where n is a positive integer, based on the predetermined information, wherein the backlight driver is configured to drive the backlight unit by identifying the dimming section corresponding to the variable refresh rate of the image, based on the predetermined information and a reception point of the sync signal.

The backlight driver may be further configured to: recognize a first sync signal among a plurality of sync signals received from the at least one processor as a timing signal for power-cycling the backlight unit, based on the predetermined information, and identify the dimming section of the backlight unit corresponding to the variable refresh rate of the image, based on the first sync signal and a second sync signal received at a different time point than the first sync signal.

The backlight driver may be further configured to: identify a variable frequency of the image corresponding to the variable refresh rate of the image based on a time interval between receiving the first sync signal and the second sync signal, and identify the dimming section of the backlight unit based on the variable frequency of the image.

The at least one processor may be further configured to execute the at least one instruction to: identify the n value based on at least one of a minimum value, a maximum value, a middle value, or an average value of the variable refresh rate of the image.

The at least one processor may be further configured to execute the at least one instruction to: identify the n value based on luminance information of the image.

The at least one processor may be further configured to execute the at least one instruction to: output the sync signal to the backlight driver in the second output frequency, the second frequency corresponding to a n-multiple, where n is two, of the first output frequency, based on the predetermined information. The backlight driver may be further configured to: identify a variable frequency of the image corresponding to the variable refresh rate of the image, based on the n value of two and a time interval between receiving a first sync signal and a second sync signal consecutive to the first sync signal, and identify the dimming section of the backlight unit based on the variable frequency of the image.

The at least one processor may be further configured to execute the at least one instruction to: based on the first output frequency having a first frequency value, output the sync signal to the backlight driver in a frequency corresponding to a first multiple (n1) of the first frequency value, and based on the first output frequency having a second frequency value, output the sync signal to the backlight driver in a frequency corresponding to a second multiple (n2) of the second frequency value, where n1 and n2 are different integers.

The at least one processor may be further configured to execute the at least one instruction to: vary a current applied in the dimming section of the backlight unit to compensate for a change in luminance of the image corresponding to the variable refresh rate.

According to an aspect of the disclosure, a method of driving a display apparatus includes: identifying a first output frequency of a sync signal that varies based on a variable refresh rate of an image; outputting the sync signal to a backlight driver in a second output frequency that is higher frequency than the first output frequency, based on predetermined information; and driving a backlight unit by identifying a dimming section of the backlight unit corresponding to the variable refresh rate of the image, based on reception of the sync signal at the backlight driver.

The predetermined information may include: information for identifying a sync signal and a variable frequency of the image, based on a variable frequency among a plurality of sync signals received at the backlight driver.

The outputting the sync signal to the backlight driver in the second output frequency may include: outputting the sync signal to the backlight driver in a frequency corresponding to a n-multiple of the first output frequency, where n is a positive integer, based on the predetermined information, and identifying the dimming section of the backlight unit corresponding to the variable refresh rate of the image, based on the predetermined information and a reception point of the sync signal.

The driving the backlight unit may include: recognizing a first sync signal among a plurality of sync signals received at the backlight driver as a timing signal for power-cyclizing the backlight unit, based on the predetermined information, and identifying the dimming section of the backlight unit corresponding to the variable refresh rate of the image, based on the first sync signal and a second sync signal received at a different time point than the first sync signal.

The method may further include: identifying a variable frequency of the image corresponding to the variable refresh rate of the image based on a time interval between receiving the first sync signal and the second sync signal at the backlight unit, and identifying the dimming section of the backlight unit based on the variable frequency of the image.

The method may further include: identifying then value based on at least one of a minimum value, a maximum value, a middle value, or an average value of the variable refresh rate of the image.

The method may further include: outputting the sync signal to the backlight driver in the second output frequency, the second frequency corresponding to a n-multiple, where n is two, of the first output frequency, based on the predetermined information; identifying a variable frequency of the image corresponding to the variable refresh rate of the image, based on the n value of two and a time interval between receiving a first sync signal and a second sync signal consecutive to the first sync signal at the backlight unit; and identifying the dimming section of the backlight unit based on the variable frequency of the image.

The method may further include: based on the first output frequency having a first frequency value, outputting the sync signal to the backlight driver in a frequency corresponding to a first multiple (n1) of the first frequency value; and based on the first output frequency having a second frequency value, outputting the sync signal to the backlight driver in a frequency corresponding to a second multiple (n2) of the second frequency value, where n1 and n2 are different integers.

The method may further include: varying a current applied in the dimming section of the backlight unit to compensate for a change in luminance of the image corresponding to the variable refresh rate.

According to an aspect of the disclosure, a non-transitory computer readable medium stores computer readable program code or instructions which are executable by a processor to perform a method of driving a display apparatus. The method includes: identifying a first output frequency of a sync signal that varies based on a variable refresh rate of an image; outputting the sync signal to a backlight driver in a second output frequency that is higher frequency than the first output frequency, based on predetermined information; and driving a backlight unit by identifying a dimming section of the backlight unit corresponding to the variable refresh rate of the image, based on reception of the sync signal at the backlight driver.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
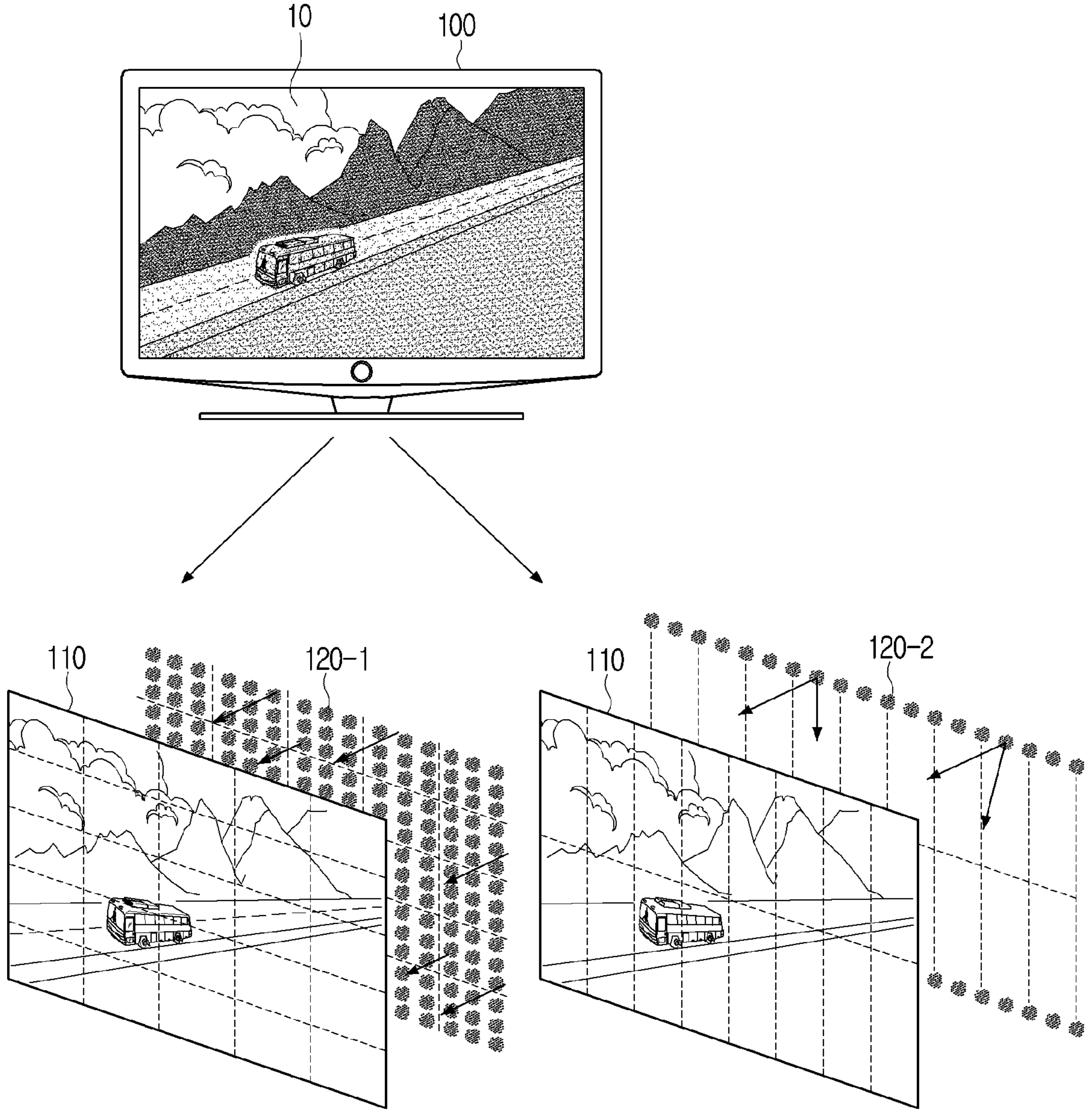
FIG. 1 is a diagram illustrating characteristics of a display panel according to one or more embodiments of the disclosure.

The terms used in the present disclosure will be described briefly, and then embodiments of the present disclosure will be described in detail.

Terms used in the present disclosure are used merely to describe a specific embodiment, and it is to be understood that the terms are not intended to limit the scope of the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g., elements such as numbers, functions, operations, and components), and do not exclude the existence of additional characteristics.

In addition, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) only A, (2) only B, or (3) both of A and B.

Further, the expressions "first," "second," and the like used in this specification may be used to describe various elements regardless of any order and/or degree of importance. Also, such expressions are used only to distinguish one element from another element, and are not intended to limit the elements.

In addition, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

Also, the expression "configured to" used in the disclosure may be interchangeably used with other expressions such as "suitable for," "having the capacity to," "designed to," "adapted to," "made to" and "capable of," depending on cases. The term "configured to" may not necessarily mean that an apparatus is "specifically designed to" in terms of hardware.

Instead, under some circumstances, the expression "an apparatus configured to" may mean that the apparatus "is capable of" performing an operation together with another apparatus or component. For example, the phrase "a processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory device.

Also, singular expressions include plural expressions, as long as they do not obviously mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the embodiments of the disclosure, "a module" or "a part" performs at least one function or operation, and may be implemented as hardware or software, or as a combination of hardware and software. Also, a plurality of "modules" or a plurality of "parts" may be integrated into at least one module and implemented as at least one processor, except "a module" or "a part" that needs to be implemented as specific hardware.

The various elements and areas in the drawings are illustrated schematically. Accordingly, the technical idea of the disclosure is not limited by the relative sizes or intervals illustrated in the accompanying drawings.

Hereinafter, embodiments of the present disclosure will be described in detail with reference to the accompanying drawings, where similar reference characters denote corresponding features consistently throughout.

FIG. 1 is a diagram illustrating characteristics of a display panel according to one or more embodiments of the disclosure.

A display panel implementing an image by using a backlight such as a quantum light-emitting diodes (QLED) panel, a liquid crystal display (LCD), etc. maintains an output image signal during a specific time for displaying an image. However, while eye movements have continuous movements, a recognized image is in a halt state during a section wherein an output signal is maintained, and thus motion blur due to this is generated. Here, motion blur refers to a phenomenon wherein the boundary of a moving object is not distinguished but looks overlapped, and thus it looks like image dragging. A motion blur phenomenon can be recognized more easily in an object area wherein a movement is big, or an object area wherein the boundary is clear in an image 10, as illustrated in FIG. 1.

As a method for Motion Blur Reduction (MBR), backlight dimming is used. Backlight dimming is a method of adjusting duty on/off of a backlight swiftly to fit the screen scanning rate corresponding to a Vertical Synchronization (Vsync) frequency which is the standard for an image to be newly refreshed and an input point. Through this, a panel afterimage that is generated in a fast movement is reduced, and a user can feel faster panel reaction speed.

Backlight dimming may be divided into local dimming wherein a screen is divided into a plurality of areas and the backlight lighting time is individually controlled for each area, and global dimming wherein the backlight lighting time for an entire screen is controlled integrally.

For example, a backlight unit 120 may be implemented as a direct type backlight unit 120-1 or an edge type backlight unit 120-2. For example, the direct type backlight unit 120-1 may be implemented as a structure wherein a plurality of optical sheets and a diffuser plate are laminated in the lower part of a display panel 110, and a plurality of light sources are arranged in the lower part of the diffuser plate. For example, the edge type backlight unit 120-2 may be implemented as a structure wherein a plurality of optical sheets and a light guiding plate are laminated in the lower part of the display panel 110, and a plurality of light sources are arranged on the side surface of the light guiding plate. According to an embodiment, in the case of using local dimming, each of a plurality of backlight blocks included in the backlight unit 120 may be respectively driven according to a dimming duty based on image information of the corresponding screen area. According to another embodiment, in the case of using global dimming, the plurality of backlight blocks included in the backlight unit 120 are not individually controlled, and the backlight lighting time may be controlled integrally.

In the case of outputting an image by using a Vsync function, if an image signal of a high frame rate is output from a GPU, a judder/stuttering phenomenon may occur due to a difference in frames between the frame rate of the original image and the fixed refresh rate due to the Vsync. To address this, a Variable Refresh Rate (VRR) technology for outputting an image to fit the frame rate of the original image is being applied. Also, the VRR technology is being applied to correspond to a variable frame rate of a source apparatus.

In the case of turning on/off the backlight unit 120 based on a fixed refresh rate for implementing Motion Blur Reduction (MBR), a current Root Mean Square (RMS) value applied to the backlight is reduced, and as a result, a phenomenon wherein the luminance becomes low occurs. Also, in the case of implementing MBR to a variable refresh rate, as the refresh rate is changed, the current RMS value is changed for each time according to the change of the Vsync value when trying to fix the duty, a phenomenon wherein the luminance of the display is not regular may occur.

Figure 2:
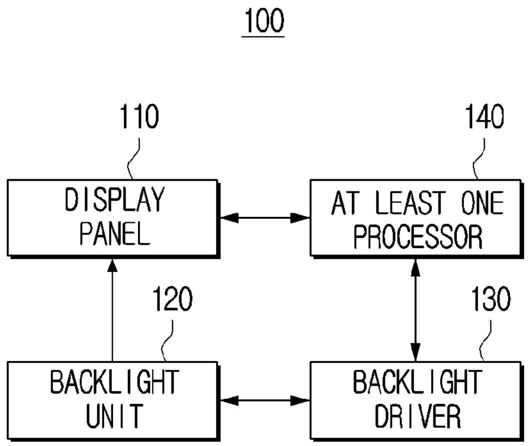
FIG. 2 is a block diagram illustrating a configuration of a display apparatus according to one or more embodiments of the disclosure.

FIG. 2 is a block diagram illustrating a configuration of a display apparatus according to one or more embodiments of the disclosure.

Referring to FIG. 2, the display apparatus 100 includes a display panel 110, a backlight unit 120, a backlight driver 130, and at least one processor 140.

The display apparatus 100 may be implemented as a smartphone, a tablet, a smart TV, an Internet TV, a web TV, an Internet protocol television (IPTV), signage, a PC, a monitor, etc., but is not limited thereto, and the display apparatus 100 may be implemented as apparatuses in various types equipped with a display function such as a large format display (LFD), digital signage, a digital information display (DID), a video wall, a projector display, etc.

The display panel 110 may include a plurality of pixels, and each pixel may consist of a plurality of sub pixels. For example, each pixel may consist of three sub pixels corresponding to a plurality of lights, e.g., lights of red, green, and blue colors (R, G, B). However, the disclosure is not limited thereto, and sub pixels of cyan, magenta, yellow, and black colors, or other colors may be included other than sub pixels of red, green, and blue colors, depending on cases. Here, the display panel 110 may be implemented as a quantum dot light-emitting diodes (QLED) panel, a liquid crystal display (LCD), etc. However, it is possible that the display panel 110 is implemented as display panels in different forms only if backlight dimming can be applied.

The backlight unit 120 irradiates a light to the display panel 110.

In particular, the backlight unit 120 irradiates a light to the display panel 110 on the rear surface of the display panel 110 (on the opposite surface of the surface on which an image is displayed).

The backlight unit 120 may include a plurality of light sources, and the plurality of light sources may include a line light source such as a lamp and a point light source such as a light emitting diode, etc., but are not limited thereto. The backlight unit 120 may be implemented as a direct type backlight unit, or as an edge type backlight unit. The light sources of the backlight unit 120 may include any one or two or more types of light sources among a light emitting diode (LED), a hot cathode fluorescent lamp (HCFL), a cold cathode fluorescent lamp (CCFL), an external electrode fluorescent lamp (EEFL), an ELP, and an FFL.

According to an embodiment, the backlight unit 120 may be implemented as a plurality of LED modules and/or a plurality of LED cabinets. Also, the LED modules may include a plurality of LED pixels, and according to an embodiment, the LED pixels may be implemented as a blue LED or a white LED, but are not limited thereto, and the LED pixels may be implemented in a form of including at least one of a red LED, a green LED, or a blue LED.

The backlight driver 130 may be implemented in a form of including a driver IC for driving the backlight unit 120. For example, in case the light sources included in the backlight unit 120 are implemented as LED elements, the driver IC may be implemented as at least one LED driver controlling a current applied to the LED elements. According to an embodiment, the LED driver may be arranged on the rear end of a power supply (e.g., a switching mode power supply (SMPS)), and receive a voltage from the power supply. However, according to another embodiment, the LED driver may receive a voltage from a separate power device. In an embodiment, it is possible that the LED driver is implemented in the form of a module wherein an SMPS and an LED driver are integrated as one.

The at least one processor 140 controls the overall operations of the display apparatus 100. Specifically, the at least one processor 140 may be connected with each component of the display apparatus 100, and control the overall operations of the display apparatus 100. For example, the at least one processor 140 may be electronically connected with the display panel 110, the backlight unit 120, and the backlight driver 130, and control the overall operations of the display apparatus 100. The processor 140 may consist of one or a plurality of processors.

The at least one processor 140 may perform the operations of the display apparatus 100 according to an embodiment by executing at least one instruction stored in a memory.

The at least one processor 140 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 140 may control one or a random combination of other components of the display apparatus, and perform operations regarding communication or data processing. The at least one processor 140 may execute one or more programs or instructions stored in the memory. For example, the at least one processor 140 may perform the method according to an embodiment by executing the one or more instructions stored in the memory.

In case the method according to an embodiment includes a plurality of operations, the plurality of operations may be performed by one processor, or performed by a plurality of processors. For example, when a first operation, a second operation, and a third operation are performed by the method, all of the first operation, the second operation, and the third operation may be performed by a first processor, or the first operation and the second operation may be performed by the first processor (e.g., a generic-purpose processor), and the third operation may be performed by a second processor (e.g., an artificial intelligence dedicated processor).

Also, the at least one processor 140 may be implemented as a single core processor including one core, or it may be implemented as one or more multicore processors including a plurality of cores (e.g., multicores of the same kind or multicores of different kinds). In case the at least one processor 140 is implemented as multicore processors, each of the plurality of cores included in the multicore processors may include an internal memory of the processor such as a cache memory, an on-chip memory, etc., and a common cache shared by the plurality of cores may be included in the multicore processors. Also, each of the plurality of cores (or some of the plurality of cores) included in the multicore processors may independently read a program instruction for implementing the method and perform the instruction, or the plurality of entire cores (or some of the cores) may be linked with one another, and read a program instruction for implementing the method and perform the instruction.

In case the method according to an embodiment includes a plurality of operations, the plurality of operations may be performed by one core among the plurality of cores included in the multicore processors, or they may be implemented by the plurality of cores. For example, when the first operation, the second operation, and the third operation are performed by the method, all of the first operation, the second operation, and the third operation may be performed by a first core included in the multicore processors, or the first operation and the second operation may be performed by the first core included in the multicore processors, and the third operation may be performed by a second core included in the multicore processors.

According to an embodiment, the processor may mean a system on chip (SoC) wherein at least one processor and other electronic components are integrated, a single core processor, a multicore processor, or a core included in the single core processor or the multicore processor. Also, the core may be implemented as a CPU, a GPU, an APU, a MIC, a DSP, an NPU, a hardware accelerator, or a machine learning accelerator, etc., but the embodiments of the disclosure are not limited thereto. Hereinafter, the at least one processor 140 will be referred to as the processor 140, for the convenience of explanation.

Figure 3:
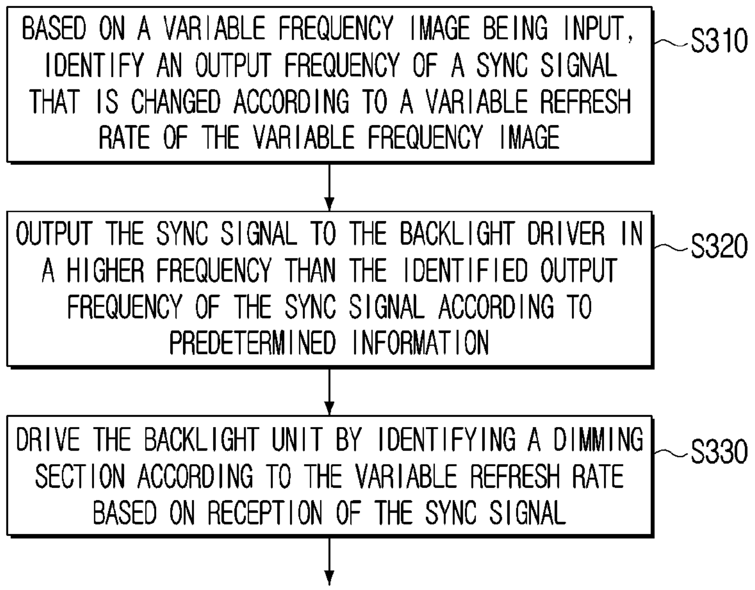
FIG. 3 is a diagram illustrating a display driving method according to one or more embodiments of the disclosure.

FIG. 3 is a diagram illustrating a display driving method according to one or more embodiments of the disclosure.

Referring to FIG. 3, in operation S310 the processor 140 may identify an output frequency (a first frequency) of a sync signal that is changed according to a variable refresh rate of an image. Here, the image may be a variable frequency image (e.g., an image having a variable frame rate), and the sync signal may be a Vertical Synchronization (Vsync) signal (e.g., a reference signal to refresh an image). That is, the processor 140 may identify the first frequency as a variable frequency at which to output the sync signal, where the first frequency varies based on the variable frequency (variable frame rate) of the image.

In operation S320 the processor 140 may output the sync signal to the backlight driver 130 in a higher frequency (a second frequency) than the identified output frequency of the sync signal according to predetermined information. That is, the processor 140 may output the sync signal in the second frequency that is higher than the first frequency.

In operation S330, the backlight driver 130 may drive the backlight unit 120 by identifying a dimming section based on the variable refresh rate, based on receipt of the sync signal.

Here, the predetermined information may include information for identifying a sync signal, and for identifying a variable frequency of the image (e.g., variable frame rate of the image) based on the variable frequency of sync signals received at the backlight driver 130. For example, in case the predetermined information is two times, if the output frequency of a sync signal is 60 Hz, the processor 140 may output the sync signal to the backlight driver 130 in a frequency of 120 Hz. In this case, if sync signals are received by an interval of 1/120 second, the backlight driver 130 may recognize only a sync signal received by an interval of 1/60 second as a timing signal for backlight dimming, and recognize a sync signal received on a different time point as a sync signal for identifying the dimming section of the backlight unit according to the variable refresh rate. That is, the backlight driver 130 is aware in advance that sync signals are received by two times of the refresh rate of an image signal, and if sync signals are received by an interval of 1/120 second, the backlight driver 130 may recognize that the refresh rate of the image signal is 60 Hz, and identify the backlight dimming section based on this. Accordingly, even if the refresh rate of the image varies, the varied refresh rate of the image can be predicted before a sync signal for the next backlight dimming is received, and thus it becomes possible to appropriately respond to the refresh rate.

Figure 4:
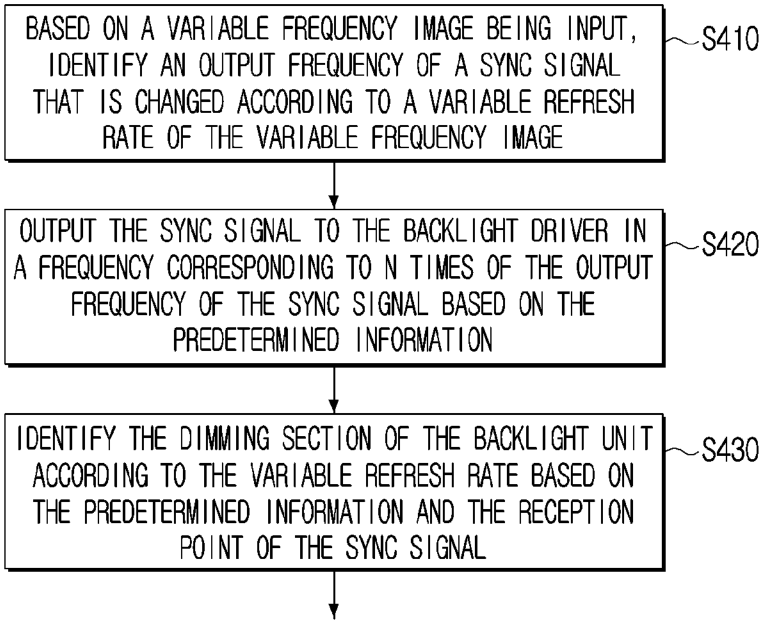
FIG. 4 is a diagram illustrating a display driving method according to one or more embodiments of the disclosure.

FIG. 4 is a diagram illustrating a display driving method according to one or more embodiments of the disclosure.

Referring to FIG. 4, in operation S410 if a variable frequency image is input, the processor 140 may identify an output frequency of a sync signal that is changed according to a variable refresh rate of the variable frequency image. That is, the processor 140 may identify a variable output frequency that changes based on the variable refresh rate of the image. Here, the sync signal may be a Vsync signal.

In operation S420 the processor 140 may output the sync signal to the backlight driver 130 in a frequency corresponding to a multiple (e.g., n times) of the identified output frequency of the sync signal based on the predetermined information. Here, the predetermined information may be information that is set such that a sync signal is output in a frequency corresponding to n times of the output frequency of the sync signal identified based on an input image. Here, the n value may be a value defined in advance as a number bigger than 1 (a value set at the time of manufacturing, or a value set by a user). For example, the n value may be an integer of 2 or bigger, but is not necessarily limited thereto. According to an embodiment, in case the n value is set as 2 when outputting a variable frequency image in a frame rate of 60 Hz, the processor 140 may output a sync signal in 120 Hz.

In operation S430 the backlight driver 130 may drive the backlight unit 120 by identifying a dimming section according to the variable refresh rate based on the predetermined information and the reception point of the sync signal. Here, the dimming section may mean a time section wherein the backlight is turned on in one frame section.

According to an embodiment, the backlight driver 130 may recognize a first sync signal among the sync signals received from the processor 140 as a timing signal for turning on or off (e.g., power-cycling) the backlight unit 120 based on the predetermined information. Also, the backlight driver 130 may identify the dimming section (or the effective dimming time) of the backlight unit 120 according to the variable refresh rate based on the first sync signal and a second sync signal received on a different time point from the first sync signal. This is because the second sync signal is a signal that is received as the sync signal is output in a frequency corresponding to n times of the output frequency of the sync signal identified based on the input image. That is, the second sync signal is a signal for the backlight driver 130 to identify the dimming section according to the variable refresh rate, and is not a timing signal for actually turning on or off the backlight unit 120.

For example, the backlight driver 130 may identify the variable frequency of the image according to the variable refresh rate based on the time that is n times of a time interval by which the first sync signal and the second sync signal are received. For example, in case the time interval by which the first sync signal and the second sync signal are received is 1/120 second, the backlight driver 130 may multiply 1/120 with n times included in the predetermined information, and identify the actual refresh rate of the input image. For example, in case the n value is set as 2, the backlight driver 130 may identify the variable frequency of the image as 1/120 second*2=1/60 second (e.g., 60 Hz). In this case, even if the refresh rate of the image continuously varies, the varied refresh rate can be identified immediately, and the backlight dimming section can be set based on it.

Figure 5:
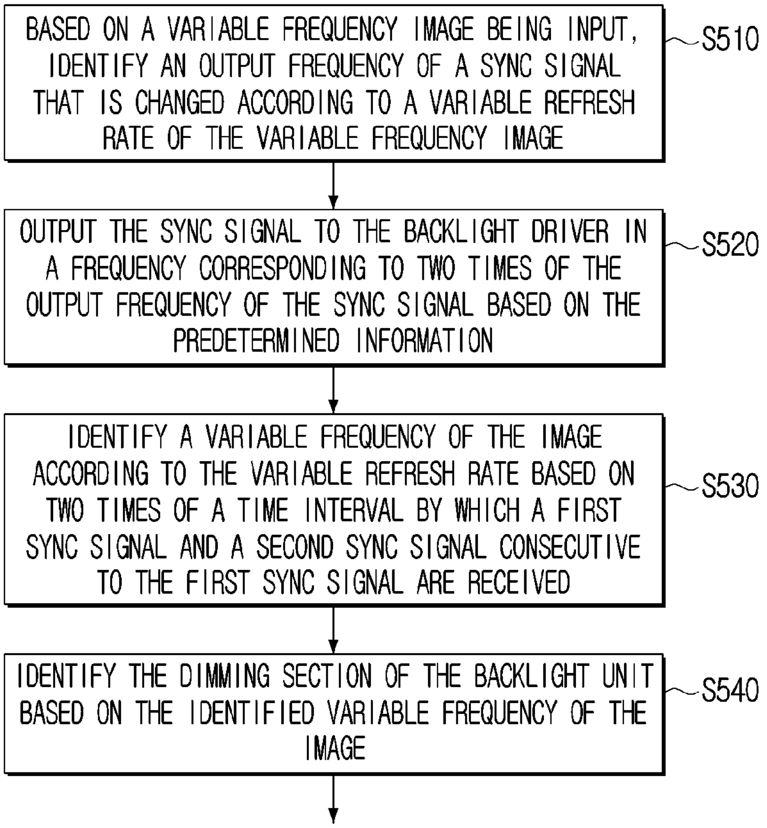
FIG. 5 is a diagram illustrating a display driving method according to one or more embodiments of the disclosure.

FIG. 5 is a diagram illustrating a display driving method according to one or more embodiments of the disclosure.

Referring to FIG. 5, if a variable frequency image is input, the processor 140 may identify an output frequency of a sync signal that is changed according to a variable refresh rate of the variable frequency image in operation S510. Here, the sync signal may be a Vsync signal.

The processor 140 may output the sync signal to the backlight driver 130 in a frequency corresponding to two times of the identified output frequency of the sync signal based on the predetermined information in operation S520. Here, the predetermined information may be information that is set such that a sync signal is output in a frequency corresponding to two times of the output frequency of the sync signal identified based on an input image.

In this case, the backlight driver 130 may identify a variable frequency of the image according to the variable refresh rate based on two times of a time interval by which a first sync signal and a second sync signal consecutive to the first sync signal are received in operation S530.

Then, the backlight driver 130 may identify the dimming section of the backlight unit 120 based on the identified variable frequency of the image and drive the backlight unit 120. For example, in case the time interval by which the first sync signal and the second sync signal are received is 1/120 second, the backlight driver 130 may multiply 1/120 with two times included in the predetermined information, and identify the actual refresh rate of the input image as 60 Hz. In this case, even if the refresh rate of the image continuously varies, the varied refresh rate can be identified immediately, and the backlight dimming section can be set based on it.

Figure 6:
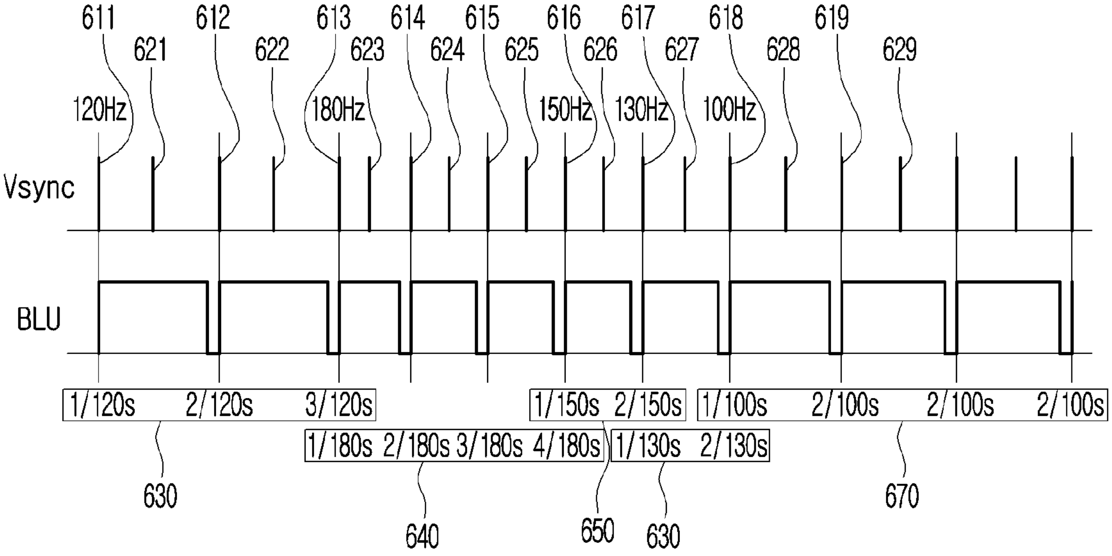
FIG. 6 is a diagram illustrating a method of identifying a backlight dimming section based on a sync signal according to an embodiment.

FIG. 6 is a diagram illustrating a method of identifying a backlight dimming section based on a sync signal according to an embodiment.

Referring to FIG. 6, the refresh rate of an image varies in a sequence including 120 Hz, 180 Hz, 150 Hz, 130 Hz, and 100 Hz.

In this case, first Vsync signals (611-619) for controlling on/off of the backlight unit 120 based on the refresh rate of the image is identified as 1/120 second in interval 630, 1/180 second in interval 640, 1/150 second in interval 650, 1/130 second in interval 660, and 1/100 second in interval 670. However, according to an embodiment, as the Vsync signals are output in two times of the refresh rate of the image, second Vsync signals (621-629) may be additionally output among the first Vsync signals (611-619). In this case, the backlight driver 130 may predict the refresh rate of the image that varies based on the intervals of the first Vsync signals (611-619) and the second Vsync signals (621-629), and set the backlight dimming section based on this. Accordingly, a motion blur reduction function can be implemented by which increase/decrease of the luminance is minimized even if the refresh rate of the image varies.

Figure 7A:
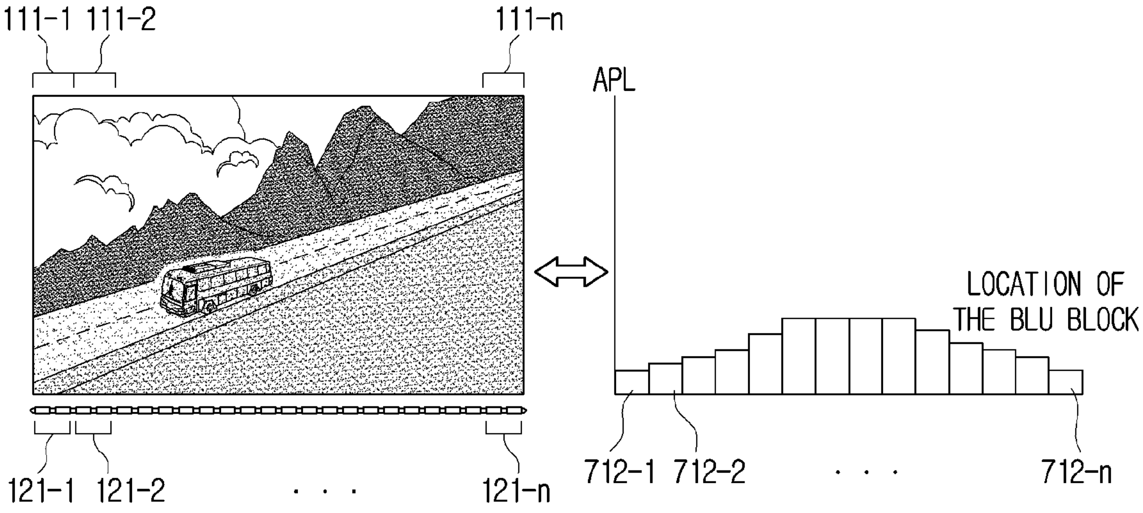
FIG. 7A and FIG. 7B are diagrams illustrating a method of identifying a dimming duty of each backlight block at a time of local dimming according to an embodiment.
Figure 7B:
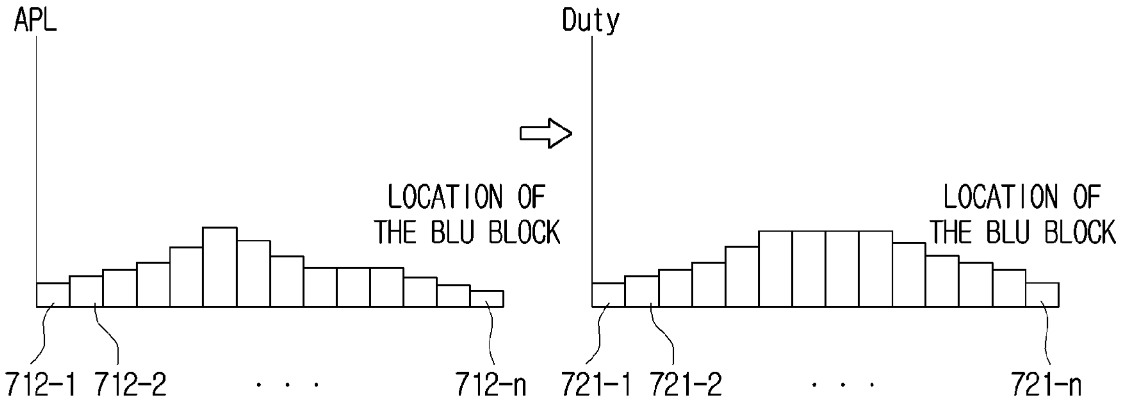

FIG. 7A and FIG. 7B are diagrams illustrating a method of identifying a dimming duty of each backlight block at the time of local dimming according to an embodiment.

Referring to FIGS. 7A and 7B, if a variable refresh rate of an image is identified, the processor 140 may identify the backlight dimming section based on the identified refresh rate (e.g., the display time of the image frame) and the pixel information of the image frame.

In case the backlight unit is implemented as an edge type backlight unit 120-2, the processor 140 may acquire the pixel information of each of image areas to be displayed in a screen area corresponding to each of the backlight blocks (e.g., APL information), and calculate the dimming duty of the backlight block corresponding to the screen area based on the acquired pixel information.

For example, as illustrated on the right side of FIG. 7A, the processor 140 may calculate the APL information of the image areas 111-1 to 111-*n* corresponding to each backlight block 121-1 to 121-*n*. For example, the left side of FIG. 7B illustrates a case wherein the APL values 711-1 to 711-*n* of each image area 111-1 to 111-*n* is calculated.

As illustrated in FIG. 7B, the processor 140 may calculate the dimming duties 721-1 to 721-*n* of each backlight block 121-1 to 121-*n* corresponding to each screen area based on the APL values of each image area acquired in FIG. 7A. For example, the dimming duties of each backlight block 121-1 to 121-*n* may be calculated by applying a predetermined weight to the APL values of each image area. For example, the dimming duty of an image area wherein the APL is 10% may be calculated as 10%*6=60%, and the dimming duty of an image area wherein the APL is 7% may be calculated as 7%*6=42%. However, this is merely an example of calculating a dimming duty, and a dimming duty can be calculated by various methods based on the pixel information of each screen area. When a dimming duty is calculated as described above, the processor 140 may multiply the display time of an image frame with the dimming duty, and identify the backlight dimming section in each frame section (e.g., the backlight on/off time).

According to an embodiment, global dimming may be used for Motion Blur Reduction (MBR). In this case, dimming duties of each backlight block 121-1 to 121-*n* are not individually calculated, but a dimming duty to be applied integrally to each backlight block 121-1 to 121-*n* may be calculated based on the pixel information of the entire image to be displayed. For example, a dimming duty of the backlight blocks corresponding to the entire screen area may be calculated based on the APL information corresponding to the entire image to be displayed. In an embodiment, integral dimming control may be performed for each backlight block 121-1 to 121-*n* based on a representative value (e.g., an average value) of dimming duties that were individually calculated for each backlight block 121-1 to 121-*n*.

Figure 8:
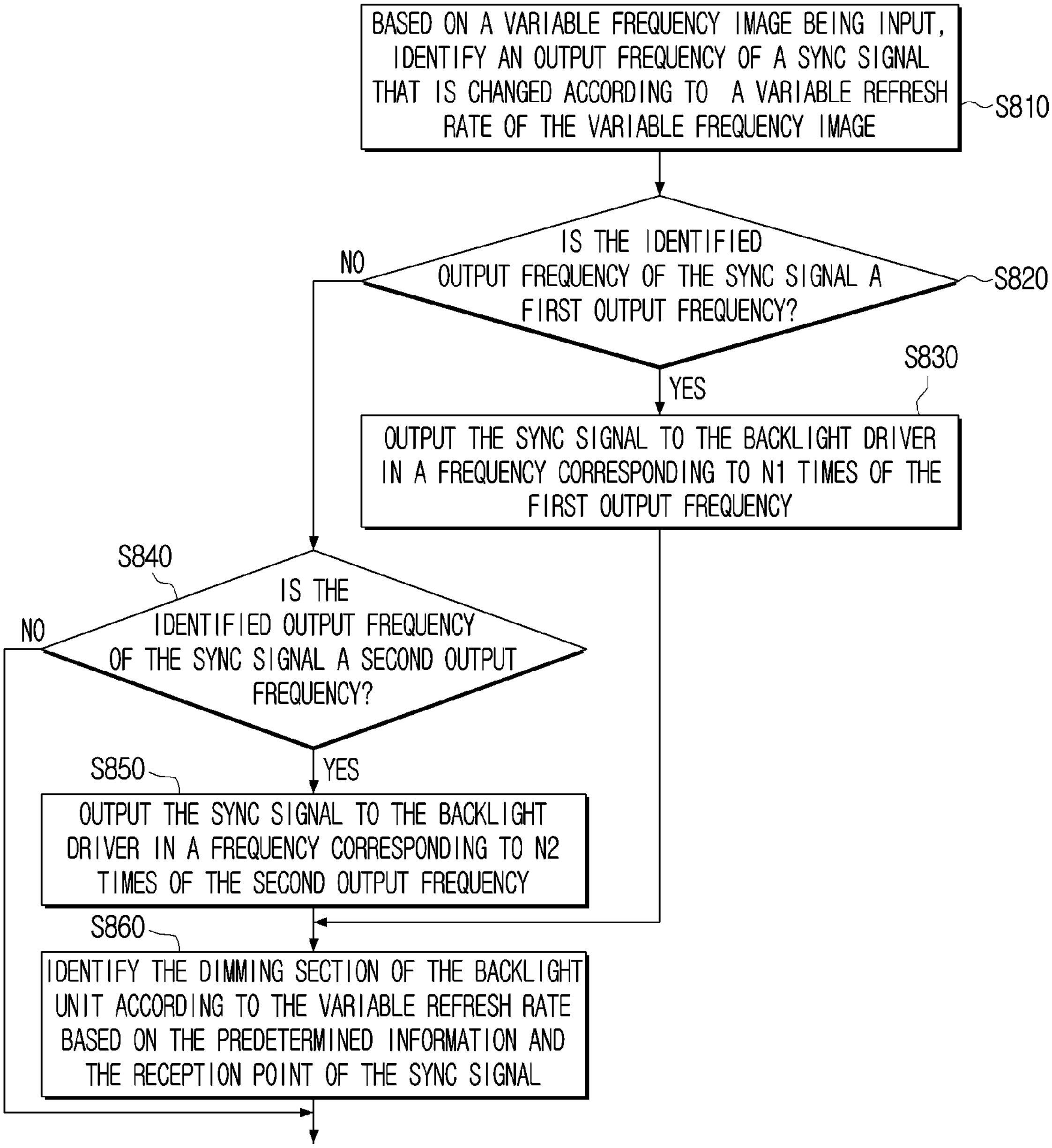
FIG. 8 and FIG. 9 are diagrams illustrating a display driving method according to one or more embodiments of the disclosure.
Figure 9:
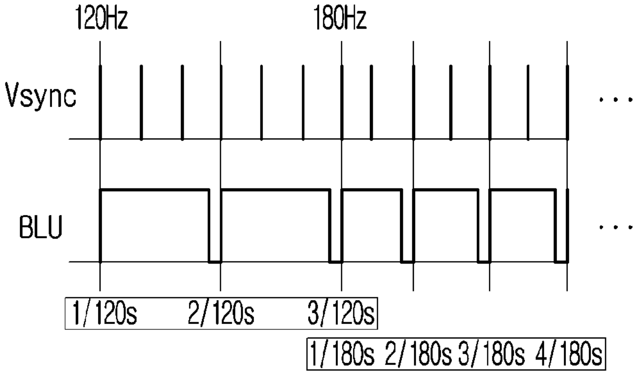

FIG. 8 and FIG. 9 are diagrams illustrating a display driving method according to one or more embodiments of the disclosure.

Referring to FIG. 8, in operation S810 if a variable frequency image is input, the processor 140 may identify an output frequency of a sync signal that is changed according to a variable refresh rate of the variable frequency image. Here, the sync signal may be a Vsync signal.

In operation S820, if the identified output frequency of the sync signal is a first output frequency, then in operation S830 the processor 140 may output the sync signal to the backlight driver 130 in a frequency corresponding to n1 times of the first output frequency.

In operation S820, if the identified output frequency of the sync signal is not a first output frequency, and in operation S840 if the identified output frequency of the sync signal is a second output frequency, then in operation S850 the processor 140 may output the sync signal to the backlight driver 130 in a frequency corresponding to n2 times of the second output frequency. Here, the n1 and the n2 may be different values, and they may be, for example, different integers.

In operation S860, the backlight driver 130 may identify the dimming section of the backlight unit 120 according to the variable refresh rate based on the predetermined information and the reception point of the sync signal.

According to an embodiment, the n value may be set to be inverse proportional to an output frequency. For example, in case the first output frequency is smaller than the second output frequency, the n1 value may be bigger than the n2 value. For example, as illustrated in FIG. 9, if the first output frequency is 120 Hz, and the second output frequency is 180

Hz, the n1 value corresponding to the first output frequency may be 3, and the n2 value corresponding to the second output frequency may be 2. Accordingly, in both of a case wherein the output frequency of the sync signal identified according to the refresh rate is 120 Hz and a case wherein the output frequency is 180 Hz, the sync signal may be output to the backlight driver 130 in 360 Hz. As described above, the n value may be adjusted to be inverse proportional to the output frequency of the sync signal identified according to the refresh rate. However, in this case, information related to the n1 and/or the n2 should be included in the sync signal corresponding to the on/off timing of the backlight. For example, the processor 140 may provide information on the n value that is changed by adjusting the impulse strength of the Vsync signal to the backlight driver 130. In this case, the backlight driver 130 may identify the n value based on the impulse strength of the Vsync signal, and identify the variable refresh rate based on it.

Figure 10:
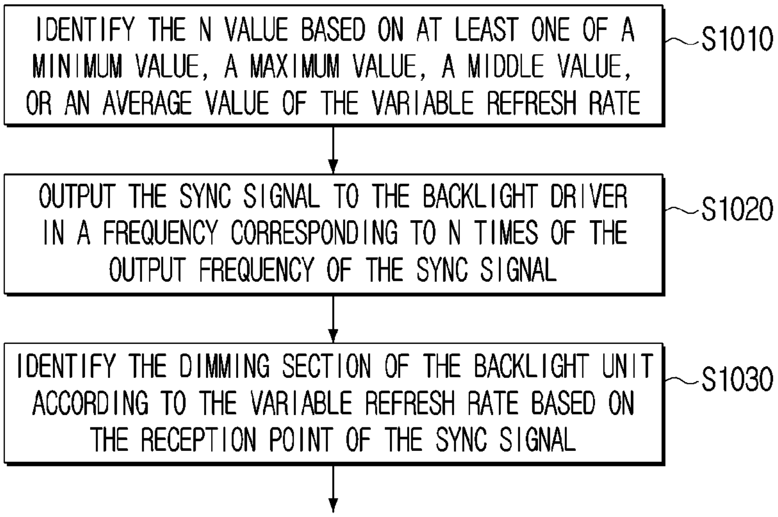
FIG. 10 is a diagram illustrating a display driving method according to one or more embodiments of the disclosure.
Figure 11:
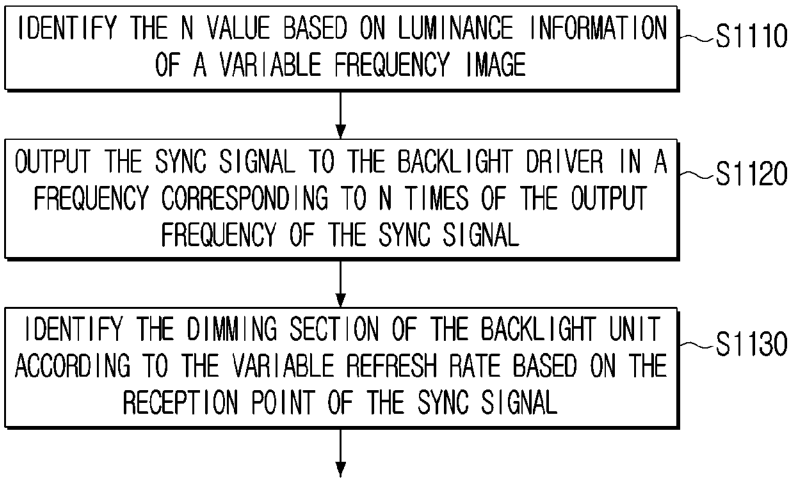
FIG. 11 and FIGS. 12A-12C are diagrams illustrating a display driving method according to one or more embodiments of the disclosure.

FIG. 10 is a diagram illustrating a display driving method according to one or more embodiments of the disclosure.

Referring to FIG. 10, in operation S1010 the processor 140 may identify an n value based on at least one of a minimum value, a maximum value, a middle value, or an average value of a variable refresh rate. According to an embodiment, it is also possible that the n value is determined based on the characteristics of the panel or information on an image. For example, the processor 140 may identify then value based on an available VRR range of the display panel 110, or identify the n value based on information on a variable frequency image (e.g., metadata). According to an embodiment, the processor 140 may set the n value as an a value in case the available VRR range of the display panel 110 is a first range, and set the n value as a b value in case the available VRR range of the display panel 110 is a second range. For example, the processor 140 may set the n value as a relatively bigger value in case the available VRR range is relatively wider, but the disclosure is not limited thereto.

In operation S1020 the processor 140 may output the sync signal to the backlight driver 130 in a frequency corresponding to n times of the output frequency of the sync signal.

In operation S1030 the backlight driver 130 may identify the dimming section of the backlight unit according to the variable refresh rate based on the reception point of the sync signal.

FIGS. 11, 12A, 12B, and 12C are diagrams illustrating a display driving method according to one or more embodiments of the disclosure.

Referring to FIG. 10, in operation S1110 the processor 140 may identify an n value based on luminance information of a variable frequency image.

According to an embodiment, the processor 140 may identify the n value based on the average luminance information of the variable frequency image. For example, in case the luminance information of the variable frequency image is low, the dimming section of the backlight within the first frame may become shorter, and thus the variable frequency of the variable frequency image should be identified relatively faster, and accordingly, the processor 140 may set the n value as a relatively bigger value. In an embodiment, in case it is possible to identify luminance information for a specific frame section (e.g., for each scene section) the processor 140 may identify the n value based on the average luminance information for each scene section. In an embodiment, in case it is possible to identify the minimum luminance information of the variable frequency image and/or the minimum luminance information for each scene section, the processor 140 may set the n value differently based on whether the minimum luminance value is greater than or equal to a threshold value.

In operation S1120 the processor 140 may output the sync signal to the backlight driver 130 in a frequency corresponding to n times of the output frequency of the sync signal.

Figure 12A:
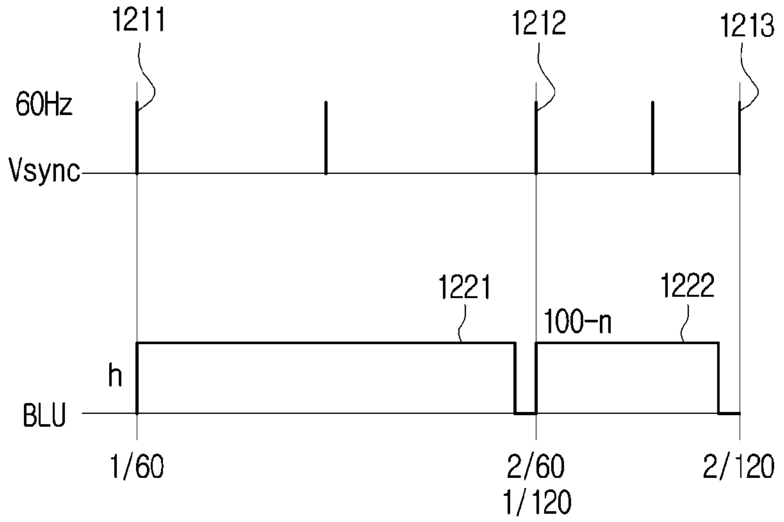
Figure 12B:
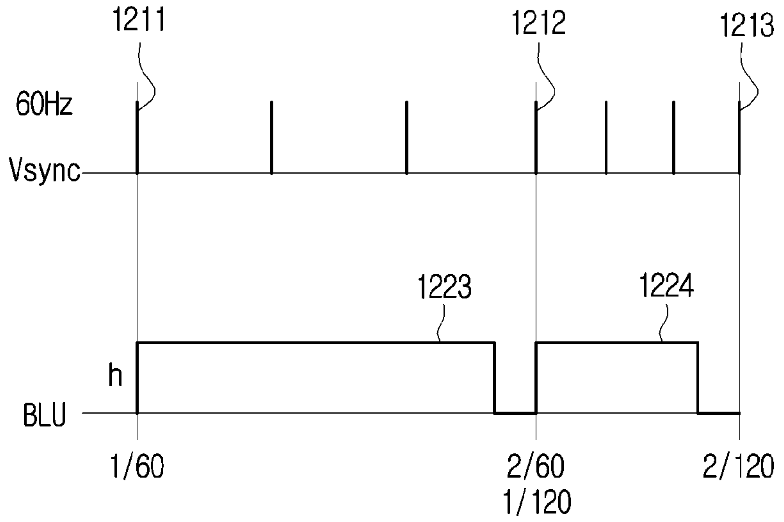
Figure 12C:
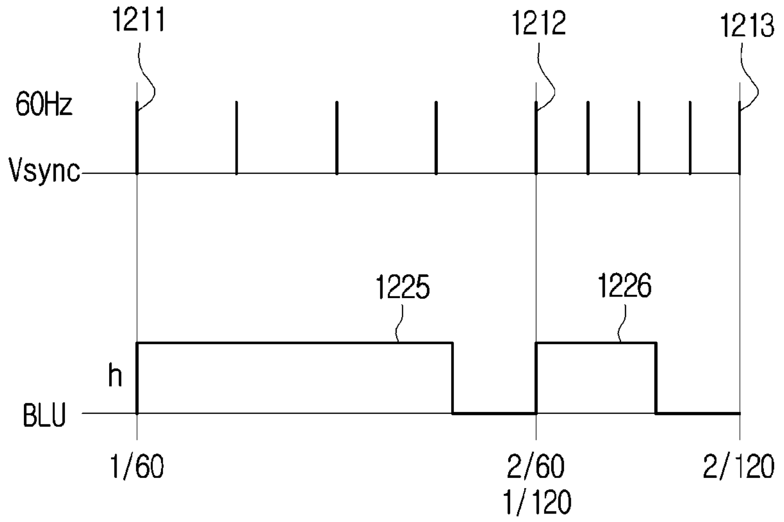

For example, as illustrated in FIGS. 12A to 12C, the n value may increase as luminance information for each specific section decreases. For example, in FIG. 12A, Vsync is output at twice the refresh rate of the image based on the first luminance information based on the backlight dimming length (1221, 1222) and thus, the second Vsyn is output once again between the first Vsyn (1211, 1212, 1213). For example, in FIG. 12B, Vsync is output at three times the refresh rate of the image based on the second luminance information based on the backlight dimming length (1223, 1224) and thus, the second Vsyn is output twice more between the first Vsyn (1211, 1212, 1213). For example, in FIG. 12C, Vsync is output at four times the refresh rate of the image based on the second luminance information based on the backlight dimming length (1225, 1226), the second Vsyn is output three times more between the first Vsyn (1211, 1212, 1213).

In operation S1130 the backlight driver 130 may identify the dimming section of the backlight unit according to the variable refresh rate based on the reception point of the sync signal.

According to an embodiment, in the case of driving the backlight unit 120 by identifying the backlight dimming section according to the aforementioned various embodiments, compensation of luminance of a variable frequency image that is changed according to the variable refresh rate of the variable frequency image may be needed. For example, in a case wherein there are too frequent changes in the refresh rate, or a case wherein the change rate of the refresh rate is big, or a case wherein the change rate of the luminance is big, etc., backlight dimming that correctly corresponds to the luminance of the image may be difficult. In this case, the processor 140 may compensate the luminance by varying the strength of a current applied in the dimming section of the backlight unit. For example, in a case wherein the luminance of the image becomes drastically lower as the refresh rate changes, etc., the processor 140 may compensate the luminance by adjusting the strength of the current, as correct backlight dimming may be difficult.

Figure 13:
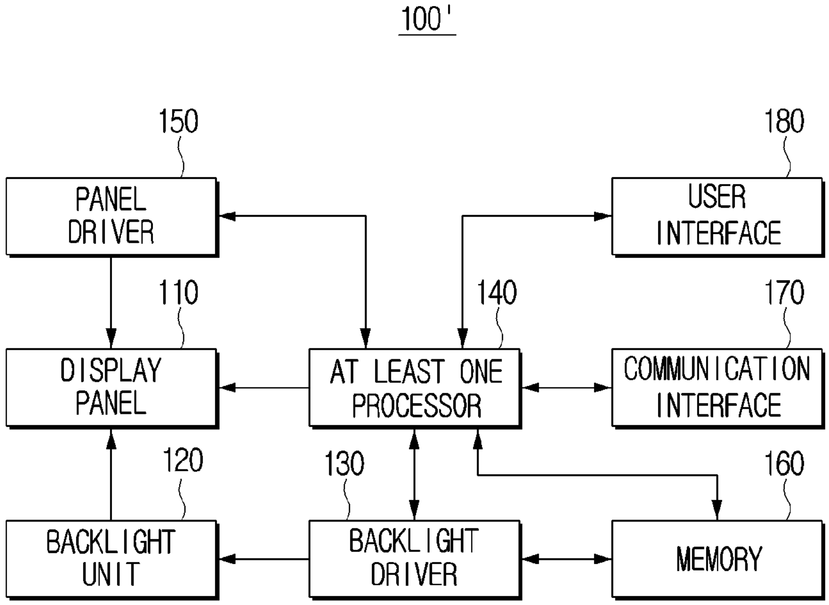
FIG. 13 is a diagram illustrating a detailed configuration of a display apparatus according to one or more embodiments of the disclosure.

FIG. 13 is a diagram illustrating a detailed configuration of a display apparatus according to one or more embodiments of the disclosure.

Referring to FIG. 13, the display apparatus 100' may include a display panel 110, a backlight unit 120, a backlight driver 130, at least one processor 140, a panel driver 150, a memory 160, a communication interface 170, and a user interface 180. Among the components illustrated in FIG. 13, regarding the components that overlap with the components illustrated in FIG. 2, detailed explanation will be omitted.

The panel driver 150 may be implemented in a form of including a driver IC for driving the display panel 110. According to an embodiment, the driver IC (e.g., a timing controller (TCON)) may be implemented as separate hardware from the processor 140. For example, the panel driver 150 may include a data driver providing video data to data lines, and a gate driver providing scan pulses to gate lines.

The data driver is a means for generating data signals, and it receives image data of R/G/B components from the processor 140 and generates a data signal. Also, the data driver is connected to the data lines DL1, DL2, DL3, . . . , DLm of the display panel 110, and applies a generated data signal to the display panel 110.

The gate driver (or a scan driver) is a means for generating gate signals (or scan signals), and it is connected to the gate lines GL1, GL2, GL3, . . . , GLn, and transmits a gate signal to a specific row of the display panel 110. To a pixel to which the gate signal is transmitted, the data signal output from the data driver is transmitted.

The memory 160 may store data necessary for various embodiments. The memory 160 may be implemented in a form of a memory embedded in the display apparatus 100', or implemented in a form of a memory that can be attached to or detached from the display apparatus 100', according to the usage of stored data. For example, in the case of data for operating the display apparatus 100', the data may be stored in a memory embedded in the display apparatus 100', and in the case of data for an extended function of the display apparatus 100', the data may be stored in a memory that can be attached to or detached from the display apparatus 100'. According to an embodiment, in the case of a memory embedded in the display apparatus 100', the memory may be implemented as at least one of a volatile memory (e.g., a dynamic RAM (DRAM), a static RAM (SRAM), or a synchronous dynamic RAM (SDRAM), etc.) or a non-volatile memory (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash, etc.), a hard drive, or a solid state drive (SSD)). Also, in the case of a memory that can be attached to or detached from the display apparatus 100', the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The communication interface 170 can be implemented as various interfaces according to implementation examples of the display apparatus 100'. For example, the communication interface 170 may receive an input of an image signal by a streaming or downloading method from an external apparatus, an external storage medium (e.g., a USB memory), an external server (e.g., a webhard), etc. through communication methods such as Bluetooth, Wi-Fi based on AP (Wi-Fi, a wireless LAN network), Zigbee, a wired/wireless Local Area Network (LAN), a Wide Area Network (WAN), Ethernet, IEEE 1394, a High-Definition Multimedia Interface (HDMI), a Universal Serial Bus (USB), a Mobile High-Definition Link (MHL), AES/EBU (Audio Engineering Society/European Broadcasting Union), Optical, Coaxial, etc. Here, the input image may be any one digital image among Standard Definition (SD), High Definition (HD), Full HD, or Ultra HD images, but is not limited thereto.

The user interface 180 may be implemented as a device such as a button, a touch pad, a mouse, and a keyboard, or may be implemented as a touch screen that can perform the aforementioned display function and a manipulation input function together, etc.

Other than the above, the display apparatus 100' may include a speaker, a camera, a microphone, a tuner, and a demodulator, etc. depending on implementation examples.

The speaker may be a component that outputs not only various kinds of audio data but also various kinds of notification sounds or voice messages, etc.

The camera may be turned on according to a predetermined event, and perform photographing.

The microphone is a component for receiving input of a user voice or other sounds, and converting them into audio data. According to an embodiment, according to another embodiment, the display apparatus 100' may receive a user voice input through an external apparatus through the communication interface 170.

The tuner may tune a channel selected by a user in a radio frequency (RF) broadcast signal received through an antenna, or all prestored channels, and receive an RF broadcast signal.

The demodulator may receive a digital IF (DIF) signal converted at the tuner and demodulate the signal, and perform channel demodulation, etc.

According to the aforementioned various embodiments, a motion blur reduction function may be implemented by which increase/decrease of luminance is minimized even if the refresh rate of an image varies.

The methods according to the aforementioned various embodiments of the disclosure may be implemented in forms of applications that can be installed on conventional display apparatuses. In an embodiment, the methods according to the aforementioned various embodiments of the disclosure may be performed by using an artificial neural network based on deep learning (or a deep artificial neural network) (e.g., a learning network model). According to an embodiment, image processing may be performed through a trained neural network model.

Also, the methods according to the aforementioned various embodiments of the disclosure may be implemented just with software upgrade, or hardware upgrade of conventional display apparatuses.

In addition, the methods according to the aforementioned various embodiments of the disclosure may be performed through an embedded server provided on a display apparatus, or an external server of a display apparatus.

The aforementioned various embodiments may be implemented as software including instructions stored in machine-readable storage media, which can be read by machines (e.g., computers). The machines refer to apparatuses that call instructions stored in a storage medium, and can operate according to the called instructions, and the apparatuses may include a display apparatus according to the aforementioned embodiments (e.g., a display apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, the methods according to the aforementioned various embodiments may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or may be distributed online through an application store (e.g., Play Store). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g., a module or a program) according to the aforementioned various embodiments may consist of a singular object or a plurality of objects. Also, among the aforementioned corresponding sub components, some sub components may be omitted, or other sub components may be further included in the various embodiments. In an embodiment, some components (e.g., a module or a program) may be integrated as an object, and perform functions performed by each of the components before integration identically or in a similar manner. Further, operations performed by a module, a program, or other components according to an embodiment may be executed sequentially, in parallel, repetitively, or heuristically. Or, at least some of the operations may be executed in a different order or omitted, or other operations may be added.

Also, while example embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims and their equivalents. Further, it is intended that such modifications are not to be interpreted independently from the technical idea or prospect of the disclosure.

What is claimed is:

1. A display apparatus comprising:
a display panel;
a backlight unit configured to output light;
a backlight driver configured to drive the backlight unit;
a memory configured to store at least one instruction; and
at least one processor operatively connected with the display panel, the backlight unit, the backlight driver, and the memory,
wherein the at least one processor is configured to execute the at least one instruction to:
identify a first output frequency of a sync signal that varies based on a variable refresh rate of an image,
output the sync signal to the backlight driver in a second output frequency that is a higher frequency than the first output frequency, based on predetermined information,
wherein the backlight driver is further configured to;
based on receiving the sync signal in the second output frequency, set a dimming section of the backlight unit corresponding to the variable refresh rate of the image by recognizing only a portion of a plurality of sync signals, received from the at least one processor, as a timing signal for power-cycling the backlight unit, wherein only the portion of the plurality of sync signals is recognized based on the predetermined information; and
drive the backlight unit according to the set dimming section.

2. The display apparatus of claim 1, wherein the predetermined information comprises information for identifying a sync signal and a variable frequency of the image, based on a variable frequency among the plurality of sync signals received at the backlight driver.

3. The display apparatus of claim 1, wherein the at least one processor is further configured to execute the at least one instruction to:
output the sync signal to the backlight driver in a frequency corresponding to a n-multiple of the first output frequency based on the predetermined information, where n is a positive integer, and
wherein the backlight driver is configured to set the dimming section corresponding to the variable refresh rate of the image, based on the predetermined information and a reception point of the sync signal.

4. The display apparatus of claim 3, wherein the backlight driver is further configured to:
recognize a first sync signal among the plurality of sync signals as the timing signal for power-cycling the backlight unit, based on the predetermined information; and
set the dimming section of the backlight unit corresponding to the variable refresh rate of the image, based on the first sync signal and a second sync signal received at a different time point than the first sync signal.

5. The display apparatus of claim 4, wherein the backlight driver is further configured to:
identify a variable frequency of the image corresponding to the variable refresh rate of the image based on a time interval between receiving the first sync signal and the second sync signal; and
set the dimming section of the backlight unit based on the variable frequency of the image.

6. The display apparatus of claim 3, wherein the at least one processor is further configured to execute the at least one instruction to:
identify a value of n based on at least one of a minimum value, a maximum value, a middle value, or an average value of the variable refresh rate of the image.

7. The display apparatus of claim 3, wherein the at least one processor is further configured to execute the at least one instruction to:
identify a value of n based on luminance information of the image.

8. The display apparatus of claim 1, wherein the at least one processor is further configured to execute the at least one instruction to:
output the sync signal to the backlight driver in the second output frequency based on the predetermined information, the second output frequency corresponding to a n-multiple of the first output frequency, where n is two,
wherein the backlight driver is further configured to:
identify a variable frequency of the image corresponding to the variable refresh rate of the image, based on a value of n of two and a time interval between receiving a first sync signal and a second sync signal consecutive to the first sync signal; and
set the dimming section of the backlight unit based on the variable frequency of the image.

9. The display apparatus of claim 1, wherein the at least one processor is further configured to execute the at least one instruction to:
based on the first output frequency having a first frequency value, output the sync signal to the backlight driver in a frequency corresponding to a first multiple n1 of the first frequency value; and
based on the first output frequency having a second frequency value, output the sync signal to the backlight driver in a frequency corresponding to a second multiple n2 of the second frequency value, where n1 and n2 are different integers.

10. The display apparatus of claim 1, wherein the at least one processor is further configured to execute the at least one instruction to:
vary a current applied in the dimming section of the backlight unit to compensate for a change in luminance of the image corresponding to the variable refresh rate.

11. A method of driving a display apparatus, the method comprising:
identifying a first output frequency of a sync signal that varies based on a variable refresh rate of an image;

outputting the sync signal to a backlight driver in a second output frequency that is higher frequency than the first output frequency, based on predetermined information;

based on reception of the sync signal at the backlight driver, setting a dimming section of a backlight unit corresponding to the variable refresh rate of the image by recognizing only a portion of a plurality of sync signals, received at the backlight unit, as a timing signal for power-cycling the backlight unit, wherein only the portion of the plurality of sync signals is recognized based on the predetermined information; and driving the backlight unit according to the set dimming section.

12. The method of claim 11, wherein the predetermined information comprises:

information for identifying a sync signal and a variable frequency of the image, based on a variable frequency among the plurality of sync signals received at the backlight driver.

13. The method of claim 11, wherein the outputting the sync signal to the backlight driver in the second output frequency comprises:

outputting the sync signal to the backlight driver in a frequency corresponding to a n-multiple of the first output frequency based on the predetermined information, where n is a positive integer; and setting the dimming section of the backlight unit corresponding to the variable refresh rate of the image, based on the predetermined information and a reception point of the sync signal.

14. The method of claim 13, wherein the driving the backlight unit comprises:

recognizing a first sync signal among the plurality of sync signals as the timing signal for power-cyclizing the backlight unit, based on the predetermined information; and setting the dimming section of the backlight unit corresponding to the variable refresh rate of the image, based on the first sync signal and a second sync signal received at a different time point than the first sync signal.

15. The method of claim 14, further comprising:

identifying a variable frequency of the image corresponding to the variable refresh rate of the image based on a time interval between receiving the first sync signal and the second sync signal at the backlight unit; and setting the dimming section of the backlight unit based on the variable frequency of the image.

16. The method of claim 13, further comprising:

identifying a value of n based on at least one of a minimum value, a maximum value, a middle value, or an average value of the variable refresh rate of the image.

17. The method of claim 11, further comprising:

outputting the sync signal to the backlight driver in the second output frequency, the second output frequency corresponding to a n-multiple of the first output frequency, based on the predetermined information, where n is two;

identifying a variable frequency of the image corresponding to the variable refresh rate of the image, based on a value of n of two and a time interval between receiving a first sync signal and a second sync signal consecutive to the first sync signal at the backlight unit; and setting the dimming section of the backlight unit based on the variable frequency of the image.

18. The method of claim 11, further comprising:

based on the first output frequency having a first frequency value, outputting the sync signal to the backlight driver in a frequency corresponding to a first multiple n1 of the first frequency value, and based on the first output frequency having a second frequency value, outputting the sync signal to the backlight driver in a frequency corresponding to a second multiple n2 of the second frequency value, where n1 and n2 are different integers.

19. The method of claim 11, further comprising:

varying a current applied in the dimming section of the backlight unit to compensate for a change in luminance of the image corresponding to the variable refresh rate.

20. A non-transitory computer readable medium for storing computer readable program code or instructions which are executable by a processor to perform a method of driving a display apparatus, the method comprising:

identifying a first output frequency of a sync signal that varies based on a variable refresh rate of an image;

outputting the sync signal to a backlight driver in a second output frequency that is higher frequency than the first output frequency, based on predetermined information;

based on reception of the sync signal at the backlight driver, setting a dimming section of a backlight unit corresponding to the variable refresh rate of the image by recognizing only a portion of a plurality of sync signals, received at the backlight driver, as a timing signal for power-cycling the backlight unit, wherein only the portion of the plurality of sync signals is recognized based on the predetermined information; and driving the backlight unit according to the set dimming section.

* * * * *